United States Patent
Sieg et al.

(10) Patent No.: US 9,606,255 B2
(45) Date of Patent: Mar. 28, 2017

(54) ELECTRONIC SENSOR UNIT FOR DETECTING THE NONCONTACT ACTUATION OF A DOOR OR FLAP ON A MOTOR VEHICLE

(71) Applicant: HUF HÜLSBECK & FÜRST GMBH & CO. KG, Velbert (DE)

(72) Inventors: Berthold Sieg, Bottrop (DE); Erik Kiehl, Ratingen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 1 day.

(21) Appl. No.: 14/430,797

(22) PCT Filed: Sep. 12, 2013

(86) PCT No.: PCT/EP2013/068951
§ 371 (c)(1),
(2) Date: Mar. 24, 2015

(87) PCT Pub. No.: WO2014/048762
PCT Pub. Date: Apr. 3, 2014

(65) Prior Publication Data
US 2015/0226870 A1    Aug. 13, 2015

(30) Foreign Application Priority Data

Sep. 25, 2012   (DE) .................. 10 2012 109 031

(51) Int. Cl.
*G01R 27/26*   (2006.01)
*G01V 3/00*    (2006.01)
(Continued)

(52) U.S. Cl.
CPC ............ *G01V 3/00* (2013.01); *B60R 25/2054* (2013.01); *E05F 15/74* (2015.01); *F21K 9/20* (2016.08);
(Continued)

(58) Field of Classification Search
CPC .......... G06F 1/00; G06F 2101/00; H01L 21/00
See application file for complete search history.

(56) References Cited

U.S. PATENT DOCUMENTS 6,650,126 B1 * 11/2003 Indihar ................ G01D 5/2417
324/658
2006/0164230 A1 * 7/2006 DeWind ................ B60K 35/00
340/461
(Continued)

FOREIGN PATENT DOCUMENTS

DE    10 2008 025669 A1   12/2008
DE    10 2009 034549 A1    1/2011
(Continued)

OTHER PUBLICATIONS

International Search Report of International Application No. PCT/EP2013/068951 dated Dec. 17, 2013 with English Translation, 6 pages.
(Continued)

*Primary Examiner* — Jermele M Hollington
*Assistant Examiner* — Temilade Rhodes-Vivour
(74) *Attorney, Agent, or Firm* — Fay Sharpe LLP

(57) ABSTRACT

An electronic motor vehicle sensor unit includes a housing, a control and evaluation device arranged in the housing, and at least one capacitive sensor electrode with a detection region (X, X'). The capacitive sensor electrode is coupled to the control and evaluation device and is arranged in the housing. The sensor unit further includes a lighting device with an illuminant that can emit an optical signal, wherein the lighting device is coupled to the control and evaluation device, and a target region (Y) identifying the detection region (X) can be marked outside the housing with the lighting device. The housing, the control and evaluation
(Continued)

device, the at least one capacitive sensor electrode and the lighting device form an integrated assembly.

20 Claims, 3 Drawing Sheets

(51) Int. Cl.
*B60R 25/20* (2013.01)
*H03K 17/955* (2006.01)
*E05F 15/74* (2015.01)
*F21K 9/20* (2016.01)
*G06F 1/00* (2006.01)
*H01L 21/00* (2006.01)
*E05F 15/73* (2015.01)
*B60Q 1/32* (2006.01)

(52) U.S. Cl.
CPC .......... *H03K 17/955* (2013.01); *B60Q 1/323* (2013.01); *E05F 2015/765* (2015.01); *E05Y 2400/44* (2013.01); *E05Y 2400/822* (2013.01); *E05Y 2400/852* (2013.01); *E05Y 2400/858* (2013.01); *E05Y 2800/106* (2013.01); *E05Y 2900/531* (2013.01); *E05Y 2900/546* (2013.01); *E05Y 2900/548* (2013.01); *G06F 1/00* (2013.01); *G06F 2101/00* (2013.01); *H01L 21/00* (2013.01); *H03K 2217/960785* (2013.01)

(56) References Cited

U.S. PATENT DOCUMENTS

| | | | | |
|---|---|---|---|---|
| 2009/0129112 A1* | 5/2009 | Shamitz | ............ | B60Q 1/56 362/549 |
| 2009/0175026 A1* | 7/2009 | Gueneau | ............ | C03C 17/3411 362/96 |
| 2010/0321946 A1* | 12/2010 | Dingman | ............ | B60Q 1/2665 362/501 |
| 2011/0102705 A1* | 5/2011 | Miyazaki | ............ | G06F 3/0421 349/61 |

FOREIGN PATENT DOCUMENTS

| DE | 10 2010 018164 A1 | 8/2011 |
|---|---|---|
| JP | 2002-191983 A | 7/2002 |
| JP | 2011-148382 A | 8/2011 |

OTHER PUBLICATIONS

International Preliminary Report on Patentability and Written Opinion of the International Searching Authority of International Application No. PCT/EP2013/068951 dated Mar. 31, 2015, 14 pages (with English Translation).

* cited by examiner

ELECTRONIC SENSOR UNIT FOR DETECTING THE NONCONTACT ACTUATION OF A DOOR OR FLAP ON A MOTOR VEHICLE

BACKGROUND

The present invention relates to an electronic sensor unit for a motor vehicle, for detecting a noncontact actuation of a door or hatch on a motor vehicle.

The electronic sensor unit comprises a control and evaluation system, which is coupled to a capacitive sensor electrode for detecting a capacitance change to the sensor electrode during an actuation, or the approach by a user, respectively. The sensor unit furthermore comprises a lighting system, with which a target region on a substrate can be marked, wherein this target region should indicate to the user the region in which a noncontact actuation of the door or hatch is at all possible.

A control and evaluation system coupled to the sensor electrode detects a capacitance change to the sensor electrode in relation to a reference potential, in that it periodically charges and discharges the sensor electrode with a predefined frequency, and evaluates at least one parameter of a current and voltage course dependent on the periodic charging and discharging of the sensor electrode, in order to detect the capacitance change. The sensor electrode reacts thereby to the approach of objects by a capacitance change of the capacitor formed by the sensor electrode and the object This can be traced back to the fact, at the core, that the capacitance of a capacitor is dependent on its plate spacing. Normally, its capacitance increases as the object comes closer to the sensor electrode.

Capacitive sensor assemblies having sensor electrodes, with which the introduction of an object into a space in front of the electrode is detected, are known in the prior art.

From DE 10 2008 025 669 A1 an actuation device for a vehicle locking system is known, which comprises, among other things, an optical system, with which a light beam is projected onto a substrate. When this light beam is interrupted by an object, this signalizes that a door or hatch is to be unlocked. The actuation device known from the aforementioned document comprises a plurality of components, distributed over the entire vehicle. As a result, the installation of the device is cost-intensive, and prone to installation error, by way of example, in the wiring of the plurality of structural components.

It is therefor the objective of the present invention to provide a structurally simple electronic sensor assembly, which can be installed simply and quickly.

This objective is achieved in accordance with the invention by the features of claim 1.

BRIEF SUMMARY

The inventive electronic sensor unit for a motor vehicle comprises a housing, a control and evaluation system disposed in the housing, which can be coupled to a control system for the motor vehicle, and at least one capacitive sensor electrode, having a detection range, wherein the capacitive sensor electrode is coupled to the control and evaluation system, and is disposed in the housing, and wherein a capacitance change of the capacitive sensor electrode can be detected by the control and evaluation system.

The electronic sensor unit furthermore comprises a lighting system having a lamp that can emit an optical signal, wherein the lighting system is likewise coupled to the control and evaluation system, and wherein a target region characterizing the detection range outside the housing can be marked using the optical signal.

The lighting system can be disposed in or on the housing, wherein, when disposed inside the housing, the housing must exhibit an opening through which the optical signal can pass.

Independently of whether the lighting system is disposed in or on the housing, it is always disposed such that the housing, the control and evaluation system, the at least one capacitive sensor electrode, and the lighting system form an integral assembly.

When an intrusion has been detected in the detection range by the control and evaluation system, and at the same time, a user is authorized to open the motor vehicle, a door or hatch allocated thereto can be opened via a control system (which can also be, if applicable, the control and evaluation system inside the electronic sensor unit).

Advantageously, with the present invention all of the components of the electronic sensor unit are disposed inside or on a housing and form an integral unit, which can be installed quickly and without wiring requiring a great deal of time and prone to errors. For this, the electronic sensor unit is simply attached to the vehicle body at a suitable location. If the electronic sensor unit is installed inside the body, then an opening is to be supplied for the optical signal. This opening can simply be an opening in the vehicle body, through which the optical signal can pass. This opening can be provided with a transparent or translucent, colored, cover, in order to protect the electronic sensor assembly. It is also possible that the opening in the vehicle body is occupied by a section of the lighting system, which can lie flush with the body.

The inventive electronic sensor unit can be used for numerous motor vehicles, wherein it may be necessary to adapt the housing to the respective vehicle body.

The approach of an object can be detected with just one capacitive sensor electrode. In order to increase the detection precision it is provided in a preferred embodiment that the inventive electronic sensor unit has two capacitive sensor electrodes, both of which are coupled to the control and evaluation system, and are disposed at a spacing to one another in the housing. It is preferred thereby, depending on the shape and the orientation of the housing on the vehicle body, that the two capacitive sensor electrodes are offset to one another, both vertically and horizontally, when the housing is attached to the vehicle body. With an electronic sensor assembly designed and installed in this manner, the evaluation of the direction of movement can also be used to improve the detection precision.

In order to keep the structural height of the housing as low as possible, and, conversely, to keep the surface area of the capacitive sensor electrodes sufficiently large, it is provided in a preferred embodiment that the capacitive sensor electrode, or the capacitive sensor electrodes, is/are designed as flat electrode(s).

As has already been indicated, the inventive electronic sensor unit can be used with different types of vehicles and at different locations on a vehicle, e.g. for a side door or the hatchback. Different types of vehicles require, in terms of construction, a different spacing between the lamp in the lighting system and the substrate on which a target region characterizing the detection range is to be marked, wherein this substrate, in turn, is provided, for example, by a vehicle body part, or the ground as such.

In order to adjust the electronic sensor unit to the aforementioned conditions, it is provided, in a preferred embodiment of the inventive electronic sensor unit, that the electronic sensor unit comprises a lens assembly, which can be a part of the lighting system, or is disposed adjacent thereto. The target region can be optimally adjusted to the respective conditions for a specific vehicle type using this lens assembly, i.e. it is possible to ensure an optimal projection of the target region onto a substrate using the lens unit, wherein the power of the lens assembly is dependent on the vehicle type and in particular on the spacing of the lamp to the substrate.

Depending on the positioning of the electronic sensor unit inside, or on, the motor vehicle, it is subjected to a more or less strong, regular soiling, by means of which the marking of the target region on a substrate is impeded, because dirt accumulates on the lamp, or on the cover protecting the lamp.

In a preferred embodiment of the inventive electronic sensor unit it is thus provided that a self-cleaning coating is allocated to the lighting system in the region of the lamp. This coating can be a part of the lamp, part of the lighting system itself, or disposed on the lens assembly, wherein the exact structural design and positioning of the coating depends on the location and structure of the lighting system and the lens assembly on, or in, the housing. It is also conceivable that this coating is disposed on the housing itself, this being when the lighting system, and optionally the lens assembly, is accommodated entirely within the housing, and the housing has an opening (e.g. a transparent region; opening in the housing) for the optical signal.

With a self-cleaning coating, the surface behavior is modified in comparison to a "normal" coating, such that it is difficult for dirt to accumulate on the coating, and is substantially rinsed off of the coating when it comes in contact with water. With a preferred embodiment of this type, the soiling thereof is reduced, and cleaning is facilitated.

Alternatively, or additionally, it is provided in another preferred embodiment that the electronic sensor unit comprises a nozzle assembly (if applicable, coupled to the control and evaluation system), by means of which the lighting system, or the self-cleaning coating, can be rinsed with a cleaning fluid. This cleaning fluid can be water, optionally provided with a cleaning solution. The nozzle assembly can be activated as a function of the distance travelled; alternatively, it is conceivable that the nozzle assembly is activated at the same time as the actuation of the washing system for the rear window or when the user exits the vehicle.

Any common lamp suitable for marking a target region outside of a motor vehicle can be used for the lamp in the lighting system. With modern motor vehicles, a lighting of this type is typically performed by an LED. In order to be able to construct the electronic sensor unit as inexpensively as possible, it is provided in a preferred embodiment that the lamp, preferably an LED lamp, for the lighting system is disposed directly on a printed circuit board for the control and evaluation system.

One advantage of the inventive electronic sensor unit is that this can be used such that the housing is adapted to different types of motor vehicles. The adaptation to different types of motor vehicles makes it necessary to provide different housing shapes for the different structural conditions encountered with different types of vehicles. In order to avoid the necessity of different types of housings, or shapes thereof, respectively, for the different types of vehicles, it is provided in a preferred embodiment that the housing have at least one articulated region, which divides the housing into numerous housing sections, and connects these sections to one another such that they can move. The housing can be adapted to the different structural conditions of the different types of vehicles by means of this articulated region, which is typically designed in the manner of a hinged joint. In this context it is furthermore preferred that the capacitive sensor electrodes are disposed in different housing sections, such that these are spaced apart from one another, and thus, the detection quality, or sensitivity, respectively, is improved, as indicated above.

In an alternative preferred embodiment, the housing can be deformed plastically in a sub-region, such that the electronic sensor unit can be ideally adapted in the plastically deformable sub-region to the shape of a substrate, to which the electronic sensor unit is to be attached, wherein this substrate typically concerns a part of the vehicle body. To the extent that the electronic sensor unit has two capacitive sensor electrodes, it is preferred in this case that at least one capacitive sensor electrode is disposed in the plastically deformable part, and is spaced apart from the other capacitive sensor electrode.

In order to simplify the mounting of the inventive electronic sensor unit on a vehicle body part it is provided in a preferred embodiment that at least a sub-region of the housing have an adhesive coating.

BRIEF DESCRIPTION OF THE DRAWINGS

The invention shall be explained below based on preferred embodiments, which are depicted in the attached drawings, wherein.

DETAILED DESCRIPTION

Figure 1:
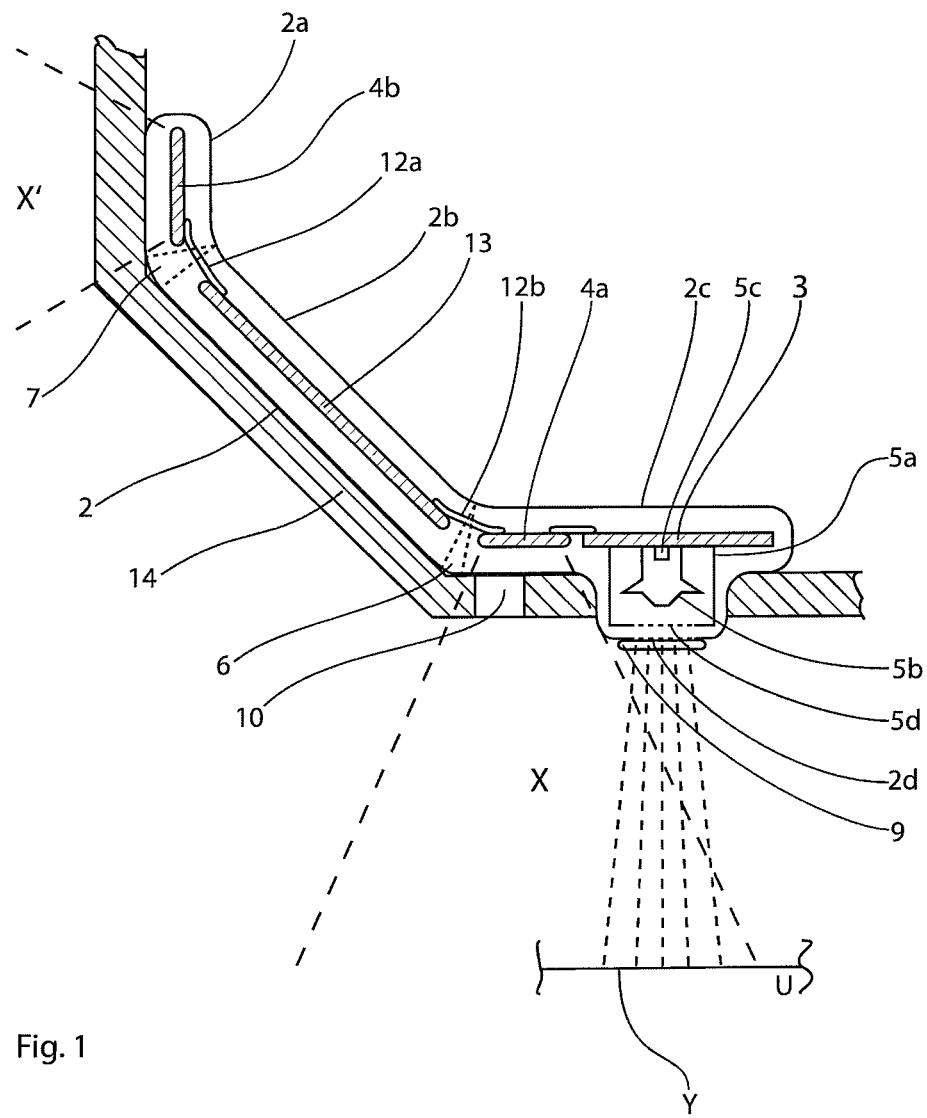
FIG. 1 shows a side view of an embodiment of the inventive electronic sensor unit.

FIG. 1 shows a sectional side view of an embodiment of the electronic sensor unit, wherein the electronic sensor unit is attached to a body component 14 of a motor vehicle. The electronic sensor unit comprises a housing 2 having three housing sections 2a, 2b, 2c, which are connected to one another via two articulated regions 6, 7. In the shown embodiment the articulated regions 6, 7 of the housing 2 are only indicated. The actual structural design for these articulated regions depends on respective application, or location. By way of example, the articulated regions can exhibit the function of a hinged joint.

Different components are disposed in the different housing sections 2a, 2b, 2c of the electronic sensor unit. A control and evaluation system 3 and a first capacitive sensor electrode 4a are disposed in the housing section 2c, wherein the first capacitive sensor electrode 4a is coupled to the control and evaluation system 3.

Furthermore, a lighting system 5a having a lamp 5c is coupled to the control and evaluation system 3. The lighting system 5a comprises an opening 5d, through which light emitted by the lamp 5c can pass. This opening 5d can simply be a cut-out, or an opening in the lighting system 5a, or it can be a transparent region in the lighting system, or a transparent cover on an opening, respectively. The important thing is that light emitted by the lamp can pass through this opening, at least in part.

In the shown embodiment, the housing section 2c comprises a bulge, into which at least a section of the lighting system 5a extends, i.e. the lighting system 5a is disposed in the housing 2 itself. With other embodiments it is also conceivable that the lighting system 5a sits on the exterior of the housing 2. The aforementioned bulge in the housing is disposed in an opening in a vehicle body part 14 of a motor vehicle, and light can be emitted from the electronic sensor unit via an opening 2d in the housing, and thus mark a target region Y on a substrate U. This opening 2d in the housing 2 can also be designed as a simple cut-out, or opening in the housing section 2c, or as a transparent region or transparent cover.

In alternative embodiments the lighting system 5a can also be disposed on the exterior of the housing—in this case it is, as a matter of course, not necessary that the housing have an opening for the light emitted by the lamp.

In the shown embodiment a lens assembly 5b is allocated to the lighting system 5a, which is disposed in the lighting system 5a itself. The lens assembly 5b is selected, depending on the spacing between the lamp 5c and the substrate U, such that an optimal focusing of the target region Y on the substrate is always provided.

Furthermore, a self-cleaning coating 9 is allocated to the lighting system 5a, and this is disposed in the shown embodiment, as a result of the lighting system being fully disposed in the housing 2, in front of the opening 2d in the housing 2, or in the housing section 2c.

The housing section 2b adjoins the housing section 2c via the articulated region 6, in which a connecting means 13 is disposed, which is coupled to the first capacitive sensor electrode 4a via a coupling element. The connecting means 13 is coupled to a second sensor electrode 4b via a second coupling element 12a in a housing section 2a, which adjoins the housing section 2b via an articulated region 7.

The first and second capacitive sensor electrodes 4a, 4b each have a detection range X, X', and it is possible for the control and evaluation system 3 to determine when an object, e.g. the foot or leg of a user, has entered a detection range X, X'. With the inventive electronic sensor unit, this detection range is relatively small, and attention is directed to this detection range X (and X') by means of the target region Y projected onto the substrate U, wherein, in the present case, the substrate is the ground. In other embodiments the substrate can also be a part of a motor vehicle.

Furthermore, in the shown embodiment a nozzle assembly 10 is disposed in the vehicle body part 14, by means of which the opening 2d in the housing section 2c can be cleaned. If the lighting system is disposed outside of the housing 2, the opening 5d for the lighting system 5a, or, if applicable, the lens assembly 5b, can be cleaned using the nozzle assembly 10.

Figure 2:
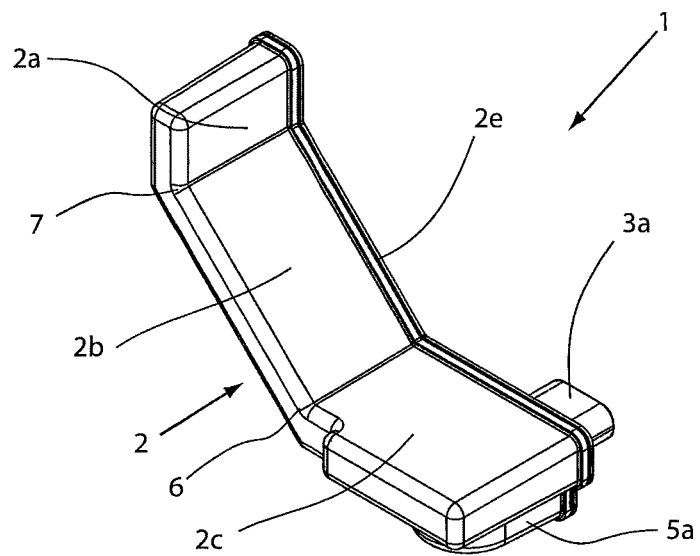
FIGS. 2 and 3 show isometric side views of a second embodiment, wherein in FIG. 3 a part of the housing is omitted.
Figure 3:
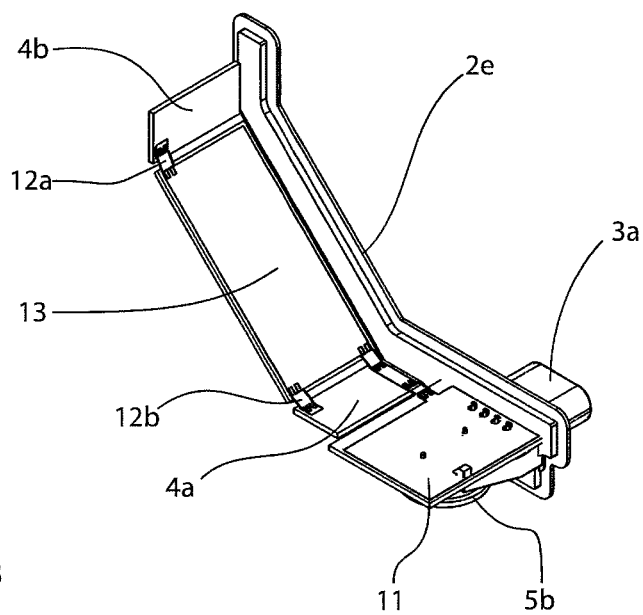

FIGS. 2 and 3 show isometric side views of an embodiment of the electronic sensor unit, wherein in FIG. 3 a part of the housing 2 is omitted. In the following, only those components that have not already been explained in detail in reference to FIG. 1 shall be explained.

It can be seen in FIG. 2 that the housing 2, with its housing sections 2a, 2b, 2c consists of two components, wherein one component serves primarily as a mount for internal systems (the "rear" component 2e) and the other component serves primarily as a cover. It can further be seen in the embodiment shown in FIGS. 2 and 3 that there is a connecting piece 3a, by means of which the electronic sensor unit can be coupled to a control system inside the motor vehicle.

As can be seen in FIG. 3, the control and evaluation system 3 comprises a printed circuit board 11, which is affixed to the housing component 2e by retaining means. This printed circuit board 11 is coupled to the first capacitive sensor electrode 4a, which in turn is connected to the connecting means 13 via the coupling element 12b, which is coupled to the second capacitive sensor electrode 4b via a coupling element 12a.

Figure 4:
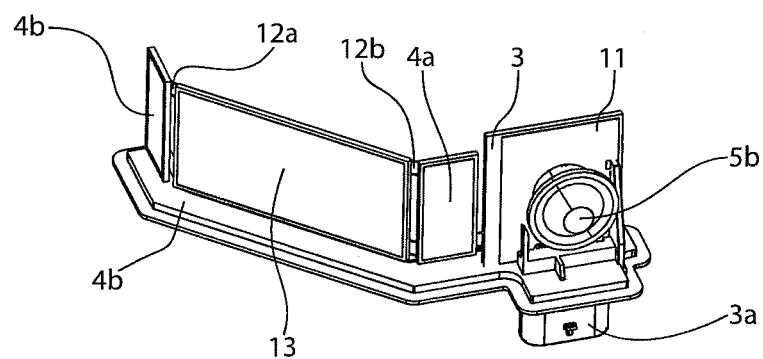
FIGS. 4 and 5 show top views of the embodiment shown in FIGS. 2 and 3, wherein the housing is omitted in the two figures, and in FIG. 5 the housing and a part of the lighting system is omitted.
Figure 5:
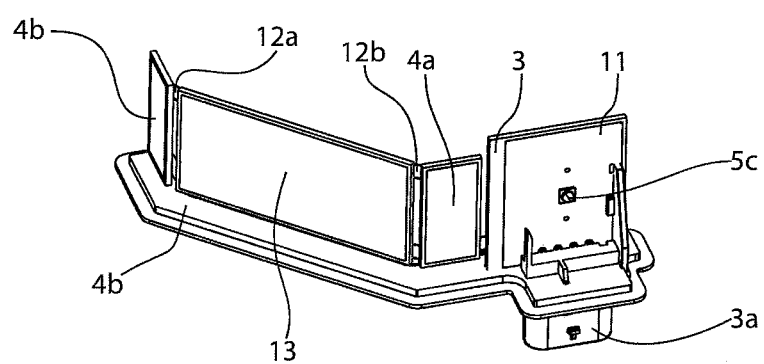

FIGS. 4 and 5 show views of the embodiment of the inventive electronic sensor unit shown in FIGS. 2 and 3, wherein a part of the housing 2 is omitted in the two figures, and in FIG. 5, moreover, the lens assembly is omitted. In the description of FIGS. 4 and 5 as well, only those components that have not already been described in reference to the other figures shall be explained.

As can be seen in FIG. 4, in the shown embodiment the lens assembly 5b is disposed directly on the printed circuit board 11 for the control and evaluation system 3, wherein the lens assembly can be supported by mounts on the housing component 2e.

The lamp 5c, designed as an LED, is disposed inside, or "behind" the lens assembly 5b, which lamp is attached directly to the printed circuit board 11 in the shown embodiment, as is indicated in FIG. 5.

The invention described above is not limited to the described and/or depicted embodiments. It is clear that numerous modifications can be made to the embodiment depicted in the drawings, obvious to the person skilled in the art, regarding the intended application, without abandoning the scope of the invention as a result. By way of example, more than just two capacitive sensor electrodes can be used.

The invention claimed is:

1. An electronic sensor unit for a motor vehicle, comprising
a housing,
a control and evaluation system disposed in the housing, which can be coupled to a control system for the motor vehicle,
at least one capacitive sensor electrode having a detection range (X), wherein the capacitive sensor electrode is coupled to the control and evaluation system and is disposed in the housing, and wherein a capacitance change in the capacitive sensor electrode can be detected by the control and evaluation system,
a lighting system with a lamp, which can emit an optical signal, wherein the lighting system is coupled to the control and evaluation system, and a target region (Y), which is provided by the ground, characterizing the detection range (X) can be marked outside the housing, and wherein
the housing, the control and evaluation system, the at least one capacitive sensor electrode and the lighting system form an integral assembly.

2. The electronic sensor unit according to claim 1, wherein the electronic sensor unit has two capacitive sensor electrodes, which are coupled to the control and evaluation system and are disposed at a spacing to one another in the housing.

3. The electronic sensor unit according to claim 1, wherein the capacitive sensor electrode(s) is/are designed as (a) flat electrode(s).

4. The electronic sensor unit according to claim 1, wherein the electrical sensor unit comprises a lens assembly.

5. The electronic sensor unit according to claim 1, wherein a self-cleaning coating is allocated to the lighting system in the region of the lamp.

6. The electronic sensor unit according to claim 1, wherein the electronic sensor unit comprises a nozzle assembly that provides to the lighting system a cleaning fluid, wherein the nozzle assembly is adapted to be coupled to the control and evaluation system.

7. The electronic sensor unit according to claim 1, wherein the lamp of the lighting system is disposed directly on a printed circuit board for the control and evaluation system.

8. The electronic sensor unit according to claim 1, wherein the housing has at least one articulated region, which divides the housing into numerous housing sections, and connects the housing sections to one another such that the housing sections are movable.

9. The electronic sensor unit according to claim 8, wherein the capacitive sensor electrodes are disposed in different housing sections.

10. The electronic sensor unit according to claim 1, wherein the housing can be plastically deformed, at least in a sub-region, such that the electronic sensor unit can be adapted to the shape of a substrate onto which the electronic sensor unit is to be attached.

11. The electronic sensor unit according to claim 1, wherein a sub-region of the housing exhibits an adhesive coating.

12. An electronic sensor unit for a motor vehicle, comprising:
   a housing having disposed therein:
      a control and evaluation system, which is adapted to be coupled to a control system for the motor vehicle;
      at least one capacitive sensor electrode which is coupled to the control and evaluation system, the at least one capacitive sensor electrode having a detection range (X); and
      a lighting system coupled to the control and evaluation system and comprising a lamp that emits an optical signal when projecting a target region (Y) onto the ground, the target region (Y) characterizing the detection range (X) of the at least one capacitive sensor electrode;
   wherein the control and evaluation system detects a capacitance change in the at least one capacitive sensor electrode when an intrusion occurs within the detection range (X) of the at least one capacitive sensor electrode.

13. The electronic sensor unit according to claim 12, wherein the housing, the control and evaluation system, the at least one capacitive sensor electrode and the lighting system form an integral assembly.

14. The electronic sensor unit according to claim 12, wherein the electronic sensor unit has two capacitive sensor electrodes, which are coupled to the control and evaluation system and are disposed at a spacing to one another in the housing.

15. The electronic sensor unit according to claim 12, wherein the capacitive sensor electrode(s) is/are designed as (a) flat electrode(s).

16. The electronic sensor unit according to claim 12, wherein the electrical sensor unit comprises a lens assembly.

17. The electronic sensor unit according to claim 12, wherein a self-cleaning coating is allocated to the lighting system in the region of the lamp.

18. The electronic sensor unit according to claim 12, wherein the electronic sensor unit comprises a nozzle assembly that provides to the lighting system a cleaning fluid, wherein the nozzle assembly is adapted to be coupled to the control and evaluation system.

19. The electronic sensor unit according to claim 12, wherein the lamp of the lighting system is disposed directly on a printed circuit board for the control and evaluation system.

20. The electronic sensor unit according to claim 12, wherein the housing has at least one articulated region, which divides the housing into numerous housing sections, and connects the housing sections to one another such that the housing sections are movable.

\* \* \* \* \*